US011467607B2

(12) United States Patent
Robin et al.

(10) Patent No.: US 11,467,607 B2
(45) Date of Patent: Oct. 11, 2022

(54) METHOD AND DEVICE FOR CONTROLLING TRAJECTORY OF A FOLLOWER AIRCRAFT

(71) Applicant: Airbus Operations (S.A.S.), Toulouse (FR)

(72) Inventors: Jean-luc Robin, Saint-Jean (FR); José Torralba, Merville (FR); Julie Lebas, Toulouse (FR)

(73) Assignee: Airbus Operations (S.A.S.), Toulouse (FR)

( * ) Notice: Subject to any disclaimer, the term of this patent is extended or adjusted under 35 U.S.C. 154(b) by 642 days.

(21) Appl. No.: 16/369,214

(22) Filed: Mar. 29, 2019

(65) Prior Publication Data
US 2019/0310642 A1 Oct. 10, 2019

(30) Foreign Application Priority Data
Apr. 4, 2018 (FR) ...................................... 1852909

(51) Int. Cl.
G05D 1/10 (2006.01)
G05D 1/02 (2020.01)
(Continued)

(52) U.S. Cl.
CPC ............. *G05D 1/104* (2013.01); *B64C 13/18* (2013.01); *G05D 1/0204* (2013.01);
(Continued)

(58) Field of Classification Search
CPC .... G05D 1/0204; G05D 1/104; G05D 1/1062; G05D 1/1064; G05D 1/0005; B64C 13/18
See application file for complete search history.

(56) References Cited

U.S. PATENT DOCUMENTS 5,845,874 A 12/1998 Beasley
6,271,768 B1 8/2001 Frazier, Jr. et al.
(Continued)

FOREIGN PATENT DOCUMENTS

CN 110347175 A 10/2019
DE 102016103704 A1 9/2017
(Continued)

OTHER PUBLICATIONS

French Search Report for Application No. 1852909 dated Oct. 22, 2018.
(Continued)

*Primary Examiner* — Nadeem Odeh
(74) *Attorney, Agent, or Firm* — Jenkins, Wilson, Taylor & Hunt, PA

(57) ABSTRACT

Method and device for determining trajectory to optimal position of a follower aircraft with respect to vortices generated by a leader aircraft. The method includes controlling trajectory of a follower aircraft to an optimal position where the follower aircraft benefits from effects of at least one of the vortices of a leader aircraft. A first section control step controls flight of the follower aircraft using current measurements of flight parameters, from a safety position to a search position, along an approach section passing through an approach zone. A second section control step controls flight of the follower aircraft using current measurements of flight parameters, from the search position to a precision position, along a search section passing through a search zone, and a third section control step controls flight of the follower aircraft, from the precision position to the optimal position, along an optimization section passing through an optimization zone.

14 Claims, 7 Drawing Sheets

(51) Int. Cl.
*B64C 13/18* (2006.01)
*G05D 1/00* (2006.01)

(52) U.S. Cl.
CPC ......... *G05D 1/1062* (2019.05); *G05D 1/1064* (2019.05); *G05D 1/0005* (2013.01)

(56) References Cited

U.S. PATENT DOCUMENTS

| | | | |
|---|---|---|---|
| 6,459,411 B2 | 10/2002 | Frazier et al. | |
| 6,483,454 B1 | 11/2002 | Torre et al. | |
| 6,683,541 B2 | 1/2004 | Staggs et al. | |
| 6,703,945 B2 | 3/2004 | Kuntman et al. | |
| 6,718,236 B1 | 4/2004 | Hammer et al. | |
| 6,963,291 B2 | 11/2005 | Holforty et al. | |
| 7,411,519 B1 | 8/2008 | Kuntman et al. | |
| 8,135,500 B1 | 3/2012 | Robinson | |
| 8,219,264 B1* | 7/2012 | Blake | G08G 5/0052 701/3 |
| 8,229,604 B2 | 7/2012 | Villaume et al. | |
| 8,362,925 B2 | 1/2013 | Brinkman et al. | |
| 8,447,443 B1* | 5/2013 | Ryan | G05B 13/042 701/3 |
| 8,949,090 B2 | 2/2015 | Whitehead et al. | |
| 9,536,435 B1 | 1/2017 | Shay | |
| 9,758,257 B1 | 9/2017 | Frolov et al. | |
| 9,864,380 B1* | 1/2018 | Ryan | G05D 1/0005 |
| 10,170,009 B2 | 1/2019 | Hiale-Guilhamou et al. | |
| 10,347,143 B2 | 7/2019 | Robin et al. | |
| 10,380,903 B2 | 8/2019 | Robin et al. | |
| 10,678,270 B2 | 6/2020 | Torralba et al. | |
| 10,884,434 B2 | 1/2021 | Robin et al. | |
| 2002/0011950 A1 | 1/2002 | Frazier et al. | |
| 2002/0063653 A1 | 5/2002 | Oey et al. | |
| 2002/0075171 A1 | 6/2002 | Kuntman et al. | |
| 2002/0080059 A1 | 6/2002 | Tran | |
| 2002/0089432 A1 | 7/2002 | Staggs et al. | |
| 2002/0154061 A1 | 10/2002 | Frazier et al. | |
| 2003/0137444 A1 | 7/2003 | Stone et al. | |
| 2003/0222795 A1* | 12/2003 | Holforty | B64D 43/00 340/968 |
| 2003/0236623 A1 | 12/2003 | Ybarra et al. | |
| 2005/0055143 A1 | 3/2005 | Doane | |
| 2005/0156777 A1 | 7/2005 | King et al. | |
| 2005/0230563 A1 | 10/2005 | Corcoran, III | |
| 2006/0244637 A1* | 11/2006 | Baranov | G01S 13/933 340/968 |
| 2007/0103340 A1 | 5/2007 | Baranov et al. | |
| 2007/0132638 A1 | 6/2007 | Frazier et al. | |
| 2007/0268175 A1 | 11/2007 | Rowlan | |
| 2007/0299611 A1 | 12/2007 | Winkler et al. | |
| 2008/0103647 A1 | 5/2008 | Lucas et al. | |
| 2009/0088972 A1 | 4/2009 | Bushnell | |
| 2010/0001882 A1 | 1/2010 | Jeddi | |
| 2010/0117892 A1 | 5/2010 | Barbaresco | |
| 2010/0292871 A1 | 11/2010 | Schultz et al. | |
| 2010/0294890 A1* | 11/2010 | Journade | B64C 9/12 244/199.1 |
| 2011/0137498 A1 | 6/2011 | Suzuki | |
| 2011/0282582 A1 | 11/2011 | Stayton et al. | |
| 2012/0209457 A1 | 8/2012 | Bushnell | |
| 2013/0261949 A1 | 10/2013 | Eriksson | |
| 2014/0136110 A1 | 5/2014 | Nykl et al. | |
| 2014/0214243 A1* | 7/2014 | Whitehead | G05D 1/0202 701/3 |
| 2015/0025797 A1 | 1/2015 | Hardesty et al. | |
| 2015/0235559 A1* | 8/2015 | Alekseev | G08G 5/0095 701/120 |
| 2016/0093224 A1 | 3/2016 | Pereira | |
| 2016/0272340 A1 | 9/2016 | Leland | |
| 2017/0110018 A1 | 4/2017 | Wang et al. | |
| 2017/0131726 A1 | 5/2017 | Speyer et al. | |
| 2017/0178516 A1 | 6/2017 | Shenfeld et al. | |
| 2017/0267371 A1* | 9/2017 | Frolov | G01F 1/68 |
| 2017/0269612 A1 | 9/2017 | Frolov et al. | |
| 2017/0293307 A1 | 10/2017 | Frolov et al. | |
| 2017/0301251 A1 | 10/2017 | Robin et al. | |
| 2017/0309192 A1 | 10/2017 | Robin et al. | |
| 2017/0315564 A1 | 11/2017 | Thomas et al. | |
| 2017/0337822 A1 | 11/2017 | Reinke et al. | |
| 2018/0301044 A1 | 10/2018 | Hiale-Guilhamou et al. | |
| 2018/0308369 A1 | 10/2018 | Robin | |
| 2018/0348796 A1 | 12/2018 | Torralba et al. | |
| 2019/0004544 A1* | 1/2019 | Feldmann | B64C 39/024 |
| 2019/0041874 A1 | 2/2019 | Robin et al. | |
| 2019/0041875 A1 | 2/2019 | Torralba et al. | |
| 2019/0041876 A1 | 2/2019 | Robin et al. | |
| 2019/0302808 A1 | 10/2019 | Robin et al. | |

FOREIGN PATENT DOCUMENTS

| | | |
|---|---|---|
| EP | 1147506 B1 | 9/2003 |
| EP | 1464037 B1 | 4/2010 |
| EP | 2187371 A1 | 5/2010 |
| EP | 2256517 A1 | 12/2010 |
| EP | 2693417 A2 | 2/2014 |
| EP | 2772817 A2 | 9/2014 |
| EP | 2851889 A2 | 3/2015 |
| EP | 2892000 A1 | 7/2015 |
| FR | 3041121 A1 | 3/2017 |
| FR | 3 049 076 A1 | 9/2017 |
| WO | WO 2004/029902 A1 | 4/2004 |
| WO | WO 2016/067019 A1 | 5/2016 |
| WO | WO 2017/161304 A1 | 9/2017 |

OTHER PUBLICATIONS

Pre-interview First Office Action for U.S. Appl. No. 16/051,143 dated Jul. 7, 2020.
Pre-interview First Office Action for U.S. Appl. No. 16/051,216 dated Jul. 24, 2020.
Pre-interview First Office Action for U.S. Appl. No. 16/051,057 dated Apr. 30, 2020.
French Search Report for Application No. 1651927 dated Dec. 8, 2016.
French Search Report for Application No. 1653444 dated Dec. 9, 2016.
French Search Report for Application No. 1753139 dated Oct. 24, 2017.
French Search Report for French Application No. 1757446 dated Apr. 24, 2018.
French Search Report for French Application No. 1757453 dated May 8, 2018.
French Search Report for French Application No. 1757452 dated May 9, 2018.
Notice of Allowance for U.S. Appl. No. 15/950,111 dated Aug. 30, 2018.
First Action Interview Pilot Program Pre-Interview Communication for U.S. Appl. No. 15/491,771 dated Sep. 6, 2018.
European Search Report for Application No. 18161829.9 dated Sep. 11, 2018.
European Office Action for Application No. 18161829.9 dated Sep. 24, 2018.
First Action Interview Pilot Program Pre-Interview Communication for U.S. Appl. No. 15/445,506 dated Oct. 2, 2018.
French Search Report for Application No. 1852633 dated Nov. 22, 2018.
First Action Interview Office Action Summary and Interview Summary for U.S. Appl. No. 15/445,506 dated Dec. 4, 2018.
First Action Interview Office Action Summary and Interview Summary for U.S. Appl. No. 15/491,771 dated Dec. 4, 2018.
European Search Report for Application No. 18182454.1 dated Jan. 3, 2019.
European Search Report for Application No. 18182461.6 dated Jan. 3, 2019.
European Search Report for Application No. 18182475.6 dated Jan. 3, 2019.
European Office Action for Application No. 18182454.1 dated Jan. 16, 2019.

(56) References Cited

OTHER PUBLICATIONS

European Office Action for Application No. 18182461.6 dated Jan. 16, 2019.
European Office Action for Application No. 18182475.6 dated Jan. 16, 2019.
Notice of Allowance for U.S. Appl. No. 15/491,771 dated Feb. 27, 2019.
Notice of Allowance for U.S. Appl. No. 15/445,506 dated Apr. 9, 2019.
Notice of Allowance for U.S. Appl. No. 16/051,216 dated Sep. 2, 2020.
First Action Interview for U.S. Appl. No. 16/051,143 dated Sep. 25, 2020.
First Action Interview for U.S. Appl. No. 16/051,057 dated Sep. 29, 2020.
Trollip, E.F. et al., "Ride comfort in commercial aircraft during formation flight using conventional flight control", 2016 IEEE Aerospace Conference, Date of Conference: Mar. 5-12, 2016, 20 pages (Year: 2016).
First Action Interview for U.S. Appl. No. 16/363,156 dated Nov. 5, 2020.
First Action Interview for U.S. Appl. No. 16/363,156 dated Jan. 12, 2021.

\* cited by examiner

METHOD AND DEVICE FOR CONTROLLING TRAJECTORY OF A FOLLOWER AIRCRAFT

CROSS-REFERENCE TO RELATED APPLICATION

This application claims priority to French patent application number 18 52909 filed on Apr. 4, 2018, the entire disclosure of which is incorporated by reference herein.

TECHNICAL FIELD

The disclosure herein relates to a method and a device for controlling the trajectory of an aircraft, termed the follower aircraft, with respect to vortices generated by an aircraft termed the leader aircraft which precedes it, the leader aircraft and follower aircraft carrying out a formation flight.

BACKGROUND

A formation flight comprises at least two aircraft, in particular transport airplanes, namely a leader aircraft (or leader), and one or more follower aircraft. The follower aircraft fly by following the aircraft that they follow directly (namely the leader aircraft or another follower aircraft) in such a way as to maintain a constant spacing between them. In a particular application, in particular in cruising flight, the aircraft fly one behind the other at the same flight level, with the same heading and the same speed. Provision may also be made to apply speed control orders to the various follower aircraft which are such that they allow the various follower aircraft to have the same position, the same speed, and the same acceleration as the leader aircraft had, at given earlier periods.

It is known that an aircraft in flight generates vortices (or wake turbulences) in its wake. By vortex (or wake turbulence) is meant an aerodynamic turbulence (or a whirlpool) which forms downstream of an aircraft.

An airplane in flight generates in its wake, mainly, two vortices, namely a vortex starting from each of its wings on account of the pressure difference between the underside and the topside of the wing, and of the deflection of the downwards air flow resulting therefrom. These vortices are counter-rotating whirlpools and are characterized by a wind field which is globally ascending outside the whirlpools and globally descending between the whirlpools.

Starting from the wings, the vortices tend firstly to approach one another, and then to maintain a more or less constant distance between them while losing altitude with respect to the altitude at which they were generated.

On account of this configuration of the vortices, it is beneficial, for a follower aircraft which is following the leader aircraft generating the vortices, to be able to profit from the ascending winds so as to reduce its fuel consumption, and therefore to bring the follower aircraft into an appropriate position.

However, the trajectory of the follower aircraft towards an appropriate position such as this may include risks of encountering zones of turbulence generated by a vortex causing a feeling of discomfort by the follower aircraft.

SUMMARY

An object of the disclosure herein is to remedy this drawback. It relates to a method of controlling the trajectory of an aircraft, termed the follower aircraft, to an optimal position, in which the follower aircraft benefits from effects of at least one of the vortices generated by an aircraft termed the leader aircraft, the leader aircraft and follower aircraft carrying out a formation flight in which the leader aircraft precedes the follower aircraft.

According to the disclosure herein, the method comprises the succession of following steps:

- a first section control step, implemented by a first control unit, the first section control step comprising or consisting in controlling the flight of the follower aircraft, on the basis of current measurements of flight parameter of the follower aircraft and of the leader aircraft, from a safety position to a search position, along a section of the trajectory termed the approach section passing through an approach zone;
- a second section control step, implemented by a second control unit, the second section control step comprising or consisting in controlling the flight of the follower aircraft, downstream of the approach section, in the direction of flight of the follower aircraft, on the basis of current measurements of flight parameter of the follower aircraft and of the leader aircraft, from the search position to a precision position, along a section of the trajectory termed the search section passing through a search zone; and
- a third section control step, implemented by a third control unit, the third section control step comprising or consisting in controlling the flight of the follower aircraft, downstream of the search section in the direction of flight of the follower aircraft, from the precision position to the optimal position, along a section of the trajectory termed optimization passing through an optimization zone.

Thus, by virtue of the disclosure herein, the follower aircraft follows an optimized trajectory to the optimization zone in which it benefits from the effects of a vortex enabling it in particular to make fuel savings. Moreover, in the course of this optimized trajectory, the risks of the follower aircraft undergoing turbulence related to a vortex causing a feeling of discomfort before reaching the optimization zone are minimized.

Advantageously, the method comprises a first determination step, implemented by a first determination module, prior to the first section control step, the first determination step consisting, with the aid of current measurements of flight parameters of the follower aircraft and leader aircraft and of a theoretical model of vortex characteristics, in determining the position of the center of a vortex and the location of an influence zone generated by and situated around a vortex, the influence zone comprising a discomfort zone and the optimization zone.

Preferentially, the method comprises a second determination step implemented by a second determination module, the second determination step comprising or consisting in determining the approach zone with the aid of measurements of flight parameters of the follower aircraft and of the leader aircraft and of values of integrity of the measurements.

In an advantageous manner, the method comprises a third determination step, implemented by a third determination module, the third determination step comprising or consisting in determining the search zone with the aid of measurements of flight parameters of the follower aircraft and of the leader aircraft and of values of precision of the measurements, the common limit between the approach zone and the search zone being defined by the search position.

Moreover, the method comprises a first calculation step, implemented by a first calculation module, the first calculation step comprising or consisting in calculating, and then in providing to the control module, the approach section in the approach zone, determined in the second determination step by the second determination module, with the aid of values of flight parameters of the follower aircraft and of the leader aircraft and of theoretical model of vortex characteristics.

Furthermore, the method comprises a second calculation step, implemented by a second calculation module, the second calculation step comprising or consisting in calculating, and then in providing to the control module, the search section in the search zone, determined in the third determination step by the third determination module, with the aid of values of flight parameters of the follower aircraft and of the leader aircraft and of theoretical model of vortex characteristics.

In an embodiment, the first section control step comprises a protection step implemented by a protection module, the protection step comprising the succession of following sub-steps:
  a first sub-step of processing measurements, implemented by a first module for processing measurements, comprising or consisting in processing values of flight parameters of the follower aircraft and of the leader aircraft in the approach zone;
  a first test sub-step, implemented by a first test module, comprising or consisting in comparing the values of flight parameters of the follower aircraft with threshold values of flight parameters, determined by theoretical model of vortex characteristics; and
  a first decision sub-step, implemented by a first decision module, consisting:
    if the measured values of flight parameters correspond to the characteristic threshold values in the influence zone of the vortex, in providing, to the control module, an item of information in respect of fallback of the follower aircraft from the approach zone to a safety position along a return section; and
    if the measured values of flight parameters do not correspond to characteristic threshold values in the influence zone, in not providing any particular item of information to the control module.

In an advantageous manner, the search section comprises a plurality of search segments the succession of which forms a spatial and temporal sweep of the search zone dependent on the vortex characteristics, so as to optimize the search for the optimization zone and the avoidance of the discomfort zone by the follower aircraft.

In an embodiment, the second section control step comprises an estimation step, implemented by an estimation module, the estimation step comprising or consisting in searching for the optimization zone and comprising the succession of following sub-steps:
  a second measurement processing sub-step, implemented by a measurement processing module, comprising or consisting in processing values of flight parameters of the follower aircraft and of the leader aircraft in the search zone;
  a second test sub-step, implemented by a test module, comprising or consisting in comparing the values of flight parameters of the follower aircraft and of the leader aircraft with threshold values of flight parameters, determined by theoretical model of vortex characteristics; and
  a second decision sub-step, implemented by a decision module, consisting:
    if the measured values of flight parameters correspond to the characteristic threshold values in the optimization zone, in providing an item of information in respect of arrival of the follower aircraft at the precision position to the control module, the precision position representing the position of entry into the optimization zone; and
    if the measured values of flight parameters correspond to characteristic threshold values in the discomfort zone, in providing an item of information in respect of passage from the current search segment to a new search segment to the control module, so as to avoid the entry of the follower aircraft into the discomfort zone; and
    if the measured values of flight parameters do not correspond to characteristic threshold values in the influence zone, in not providing any particular item of information to the control module.

Advantageously, the optimization section comprises a plurality of optimization segments the succession of which forms a temporal vertical sweep in the environs of the optimization zone and then a lateral sweep in the search zone, so as to determine the optimal position that the follower aircraft seeks to reach, each optimization segment corresponding to a distance between two current positions of the follower aircraft in the environs or in the optimization zone.

Preferably, the third section control step comprises a convergence step, implemented by a convergence module, the convergence step comprising or consisting in determining the optimal position with respect to the current position of the follower aircraft in the optimization zone and comprising the succession of following sub-steps:
  a third measurement processing sub-step, implemented by a third measurement processing module, comprising or consisting in processing flight parameter values of the follower aircraft on each optimization segment;
  a third convergence calculation sub-step, implemented by a convergence calculation module, comprising or consisting in providing the values of flight parameters to a Kalman filter until convergence of the optimal position obtained by the Kalman filter and that obtained by theoretical model of vortex characteristics is obtained; and
  a third decision sub-step, implemented by a decision module, comprising or consisting in providing an item of information in respect of flight control of the follower aircraft up to the optimal position to the control module.

The disclosure herein also relates to a system for controlling the trajectory of an aircraft, termed the follower aircraft, to an optimal position, in which the follower aircraft benefits from effects of at least one of the vortices generated by an aircraft termed the leader aircraft, the leader aircraft and follower aircraft carrying out a formation flight in which the leader aircraft precedes the follower aircraft.

To this effect, according to the disclosure herein, the system comprises:
  a first control unit comprising at least one control module and being configured to control the flight of the follower aircraft, on the basis of current measurements of flight parameter of the follower aircraft and of the leader aircraft, from a safety position to a search position, along a section of the trajectory termed the approach section passing through an approach zone;
  a second control unit comprising at least the control module and being configured to control the flight of the follower aircraft, downstream of the approach section in the direction of flight of the follower aircraft, on the basis of current measurements of flight parameter of the follower aircraft and of the leader aircraft, from the search position to a precision position, along a section of the trajectory termed the search section passing through a search zone; and a third control unit comprising at least the control module and being configured to control the flight of the follower aircraft, downstream of the search section in the direction of flight of the follower aircraft, from the precision position to the optimal position, along a section of the trajectory termed optimization passing through an optimization zone.

Advantageously, the system comprises a first determination module configured to, with the aid of current measurements of flight parameters of the follower aircraft and leader aircraft and of a theoretical model of vortex characteristics, determine the position of the center of a vortex and the location of an influence zone generated by and situated around a vortex, the influence zone comprising a discomfort zone and the optimization zone.

Moreover, the system comprises a second determination module configured to determine the approach zone with the aid of measurements of flight parameters of the follower aircraft and of the leader aircraft and of values of integrity of the measurements.

Furthermore, the system comprises a third determination module configured to determine the search zone with the aid of measurements of flight parameters of the follower aircraft and of the leader aircraft and of values of precision of the measurements, the common limit between the approach zone and the search zone being defined by the search position.

Preferably, the system comprises a first calculation module configured to calculate, and then provide to the control module, the approach section in the approach zone, determined by the second determination module in the second determination step, with the aid of values of flight parameters of the follower aircraft and of the leader aircraft and of theoretical model of vortex characteristics.

In an advantageous manner, the system comprises a second calculation module configured to calculate, and then provide to the control module, the search section in the search zone determined by the third determination module in the third determination step, with the aid of values of flight parameters of the follower aircraft and of the leader aircraft and of theoretical model of vortex characteristics.

In an embodiment, the first control unit comprises a protection module comprising:
  a first measurement processing module, configured to process values of flight parameters of the follower aircraft and of the leader aircraft in the approach zone;
  a first test module, configured to compare the values of flight parameters of the follower aircraft with threshold values of flight parameters, determined by theoretical model of vortex characteristics; and
  a first decision module, configured:
    if the measured values of flight parameters correspond to the characteristic threshold values in the influence zone of the vortex, to provide, to the control module, an item of information in respect of fallback of the follower aircraft from the approach zone to a safety position along a return section; and
    if the measured values of flight parameters do not correspond to characteristic threshold values in the influence zone, to not provide any particular item of information to the control module.

Moreover, the second control unit comprises an estimation module configured to estimate the optimization zone, the estimation module comprising:
  a second measurement processing module, configured to process values of flight parameters of the follower aircraft in the search zone;
  a second test module, configured to compare the values of flight parameters of the follower aircraft with threshold values of flight parameters determined by theoretical model of vortex characteristics; and
  a third decision module, configured:
    if the measured values of flight parameters correspond to the characteristic threshold values in the optimization zone, to provide an item of information in respect of arrival of the follower aircraft at the precision position to the control module, the precision position representing the position of entry into the optimization zone; and
    if the measured values of flight parameters correspond to characteristic threshold values in the discomfort zone, to provide an item of information in respect of passage from the current search segment to a new search segment to the control module, so as to avoid the entry of the follower aircraft into the discomfort zone; and
    if the measured values of flight parameters do not correspond to characteristic threshold values in the influence zone, to not provide any particular item of information to the control module.

Preferably, the third control unit comprises a convergence module configured to determine the optimal position with respect to the current position of the follower aircraft in the optimization zone and comprising:
  a third measurement processing module, configured to process values of flight parameters of the follower aircraft on each optimization segment;
  a third convergence calculation module, configured to provide the values of flight parameters to a Kalman filter until convergence of the optimal position obtained by the Kalman filter and that obtained by theoretical model of vortex characteristics is obtained; and
  a third decision module, configured to provide an item of information in respect of flight control of the follower aircraft up to the optimal position to the control module.

Furthermore, the disclosure herein relates to an aircraft, in particular a transport airplane, which is furnished with a control system such as that described hereinabove.

BRIEF DESCRIPTION OF THE DRAWINGS

The appended figures will elucidate the manner in which the disclosure herein may be embodied. In these example figures, identical references designate similar elements. More particularly.

DETAILED DESCRIPTION

Figure 1:
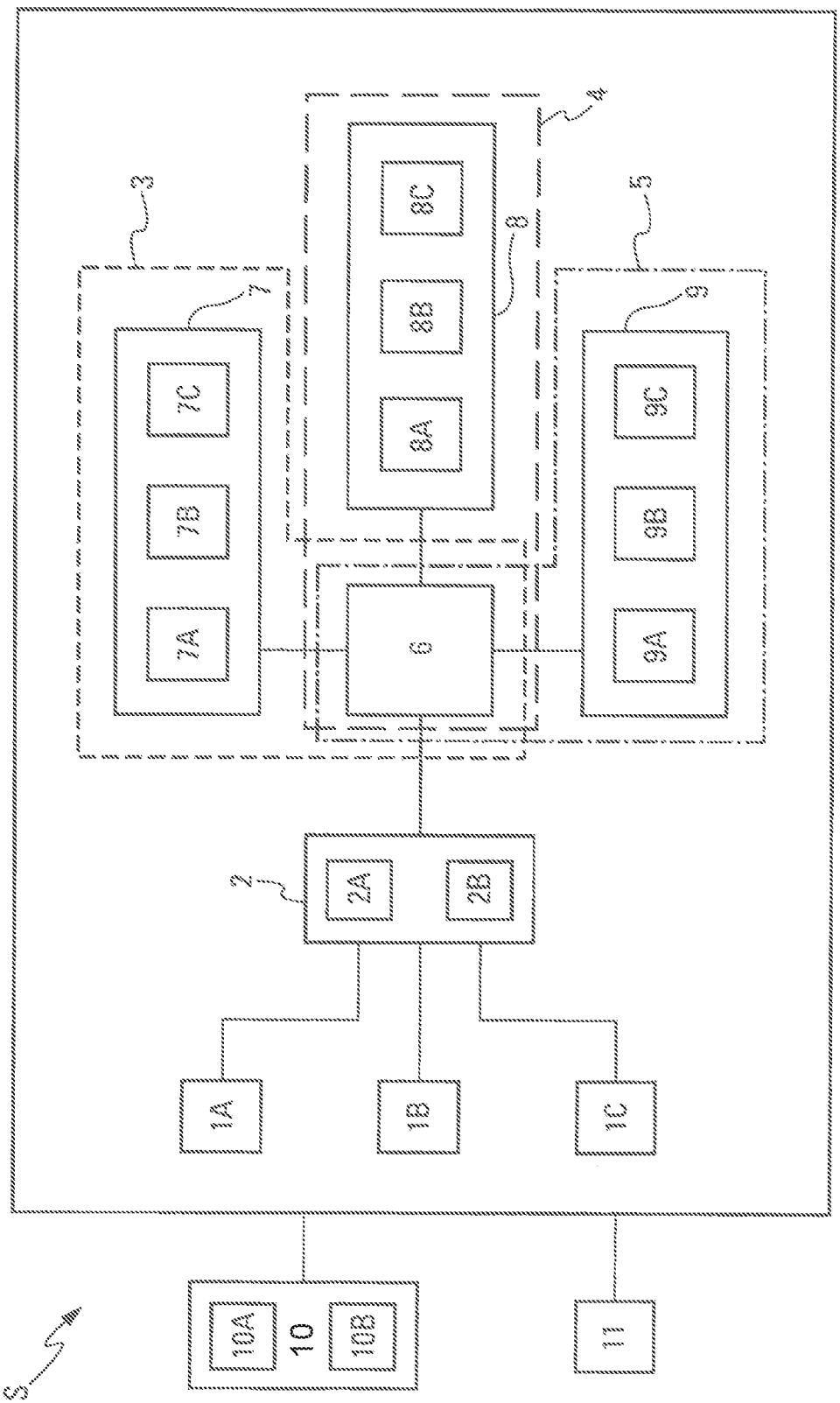
FIG. 1 is the schematic diagram of an embodiment of a system for controlling the trajectory of an craft in accordance with the disclosure herein.
Figure 2:
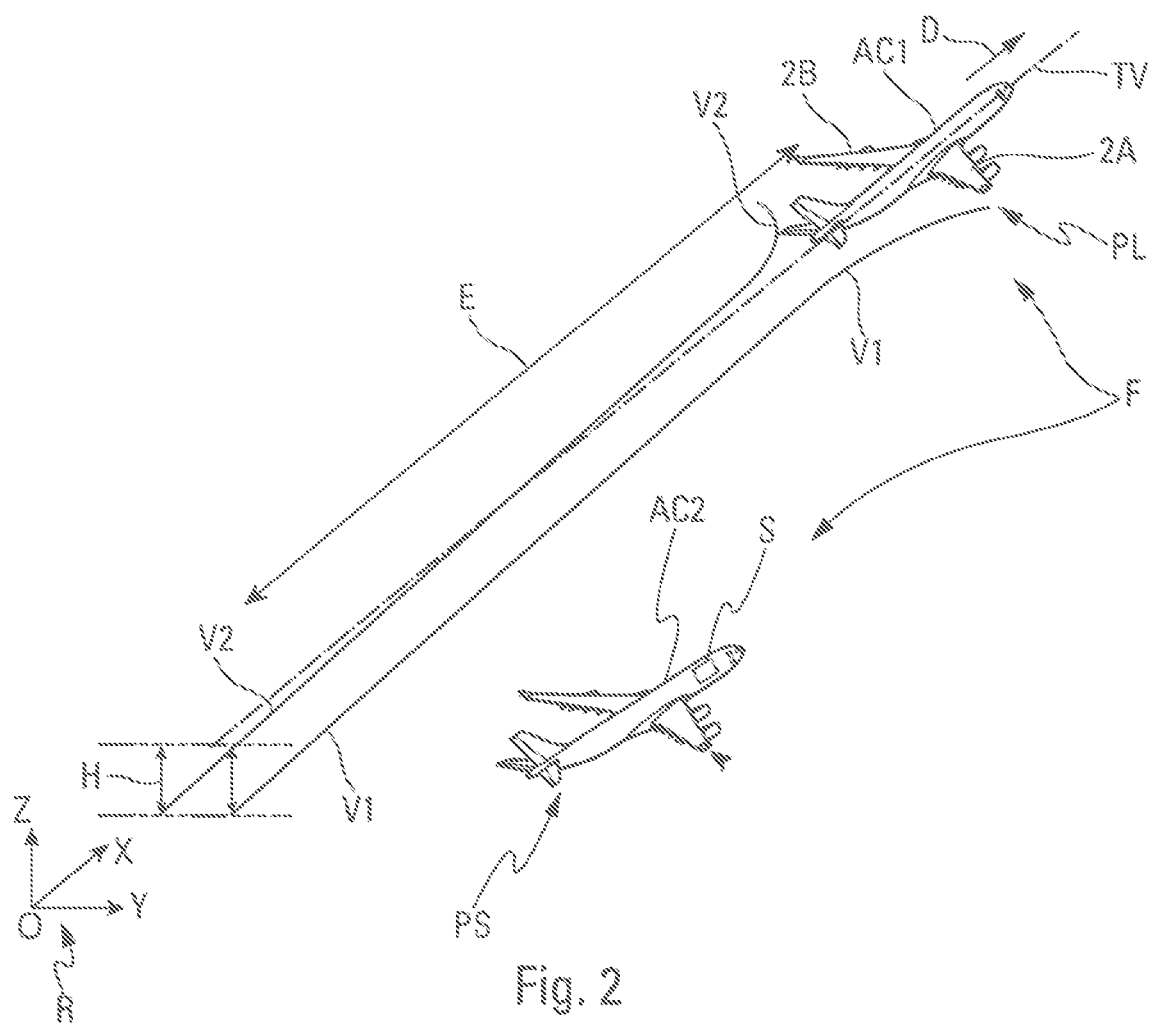
FIG. 2 is a schematic representation of a formation flight showing a leader aircraft generating vortices and an aircraft.

The system S illustrates the disclosure herein and represented in a schematic manner in FIG. 1 is a system for controlling the trajectory of a follower aircraft AC2, with respect to vortices V1 and V2 generated by a leader aircraft AC1 which precedes it, as illustrated in FIG. 2. The leader aircraft AC1 and follower aircraft AC2, for example two transport airplanes, carry out a formation flight F. The system S is mounted in the follower aircraft AC2, as represented very schematically in FIG. 2.

In a usual manner, the formation F comprises the leader aircraft AC1 and a follower aircraft, as represented in the example of FIG. 2, which follows the leader aircraft AC1, situated at a position PL. In a preferred application, in particular in cruising flight, the aircraft AC1 and AC2 fly one behind the other at the same flight level, with the same heading and the same speed.

In a preferred embodiment, the system S forms part of a general unit (not represented specifically) also comprising a formation flight management unit, which is embedded on board the follower aircraft AC2. Such a unit is configured to manage the formation flight for the follower aircraft AC2.

The leader aircraft AC1 follows a flight trajectory TV, and it generates in its wake, mainly, two vortices V1 and V2, namely a vortex V1 and V2 starting from each of its wings 2A and 2B on account of the pressure difference between the underside and the topside of each wing, and of the deflection of the downwards air flow resulting therefrom. These vortices V1 and V2 are counter-rotating whirlpools and are characterized by a wind field which is globally ascending outside the whirlpools and globally descending between the whirlpools. Starting from the wings 2A and 2B, the vortices V1 and V2 tend firstly to approach one another, and then to maintain a more or less constant distance between them while losing altitude with respect to the altitude at which they were generated. In FIG. 2 a distance E between the leader aircraft AC1 and the follower aircraft AC2 is shown.

To facilitate the following description, an orthonormal frame R is determined, represented in FIG. 2 and formed of three mutually orthogonal axes (or directions) X, Y and Z passing through a point 0, which are such that:

- X is the longitudinal axis of the fuselage of the leader aircraft AC1 oriented positively in the direction of advance S of the leader aircraft AC1;
- Z is a vertical axis which forms with the axis X a plane corresponding to the vertical symmetry plane of the leader aircraft AC1; and
- Y is a transverse axis which is orthogonal to the axes X and Z.

Although, for the sake of clarity, the point 0 is represented outside the leader aircraft AC1 in FIG. 2, it can correspond to the center of gravity of the leader aircraft AC1.

Figure 5:
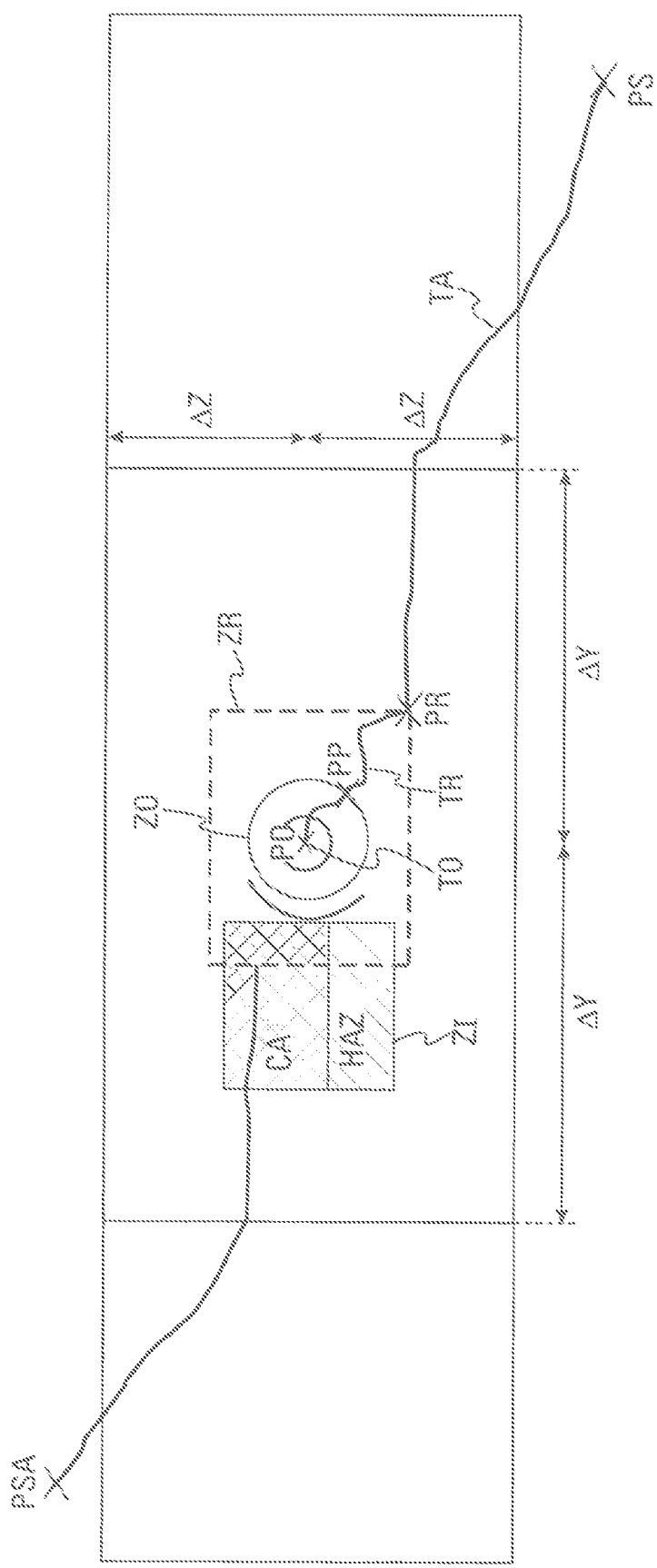
FIG. 5 represents an exemplary trajectory of the follower aircraft from a safety position to the optimal position.

The system 5, represented in FIG. 1, is configured to control the trajectory of the follower aircraft AC2, from a safety position PS to an optimal position PO, as represented in FIG. 5. The safety position PS corresponds to a position of the follower aircraft AC2 in which it does not feel any effect of at least one of the vortices V1, V2 generated by the leader aircraft AC1. The optimal position PO corresponds to a position at which the follower aircraft AC2 benefits from effects of at least one of the vortices V1, V2. These effects may in particular result in the follower aircraft AC2 making fuel savings, As represented in FIG. 1, the system S comprises a set of information sources configured to measure and receive information on flight parameters of the leader aircraft AC1 and follower aircraft AC2. The set of information sources 10 comprises at least one measurement unit 10A comprising a plurality of sensors and at least one measurement information reception unit 10B. The sensors are satellite positioning systems such as the GPS system ("Global Positioning System" in English) or the GALILEO system, onboard inertial platforms, etc. The information reception unit 10B comprises in particular an item of equipment for automatic dependent monitoring in broadcast mode ("Automatic Dependent Surveillance Broadcast" or ADS-B in English). The information reception unit 10B comprises an antenna for receiving responses of Crosslink type on a frequency of 1090 MegaHertz. It can also comprise information provided by a dedicated telecommunication link.

The set of information sources 10 measures flight parameters of the follower aircraft AC2 and leader aircraft, such as the current positions and the relative speeds.

Moreover, the measured flight parameters may also correspond to the values of the roll or lateral attitude controls from which are deducted the values of respectively the roll control or lateral attitude control which are estimated in the absence of any vortex influence. The measured flight parameters can also correspond to the sideslip, to the angular yaw rate, to the angular roll rate and to the lateral attitude.

Moreover, the system S comprises a calculation element 11 which is configured to calculate vortex characteristics, using a theoretical model of vortex characteristics. The vortex V1, V2 characteristics depend on criteria representative of parameters of the leader aircraft AC1: weight, wingspan, speed of the air, density of the air, temperature of the air, wind felt. The vortex V1, V2 characteristics also depend on the wind felt by the follower aircraft AC2.

Figure 4:
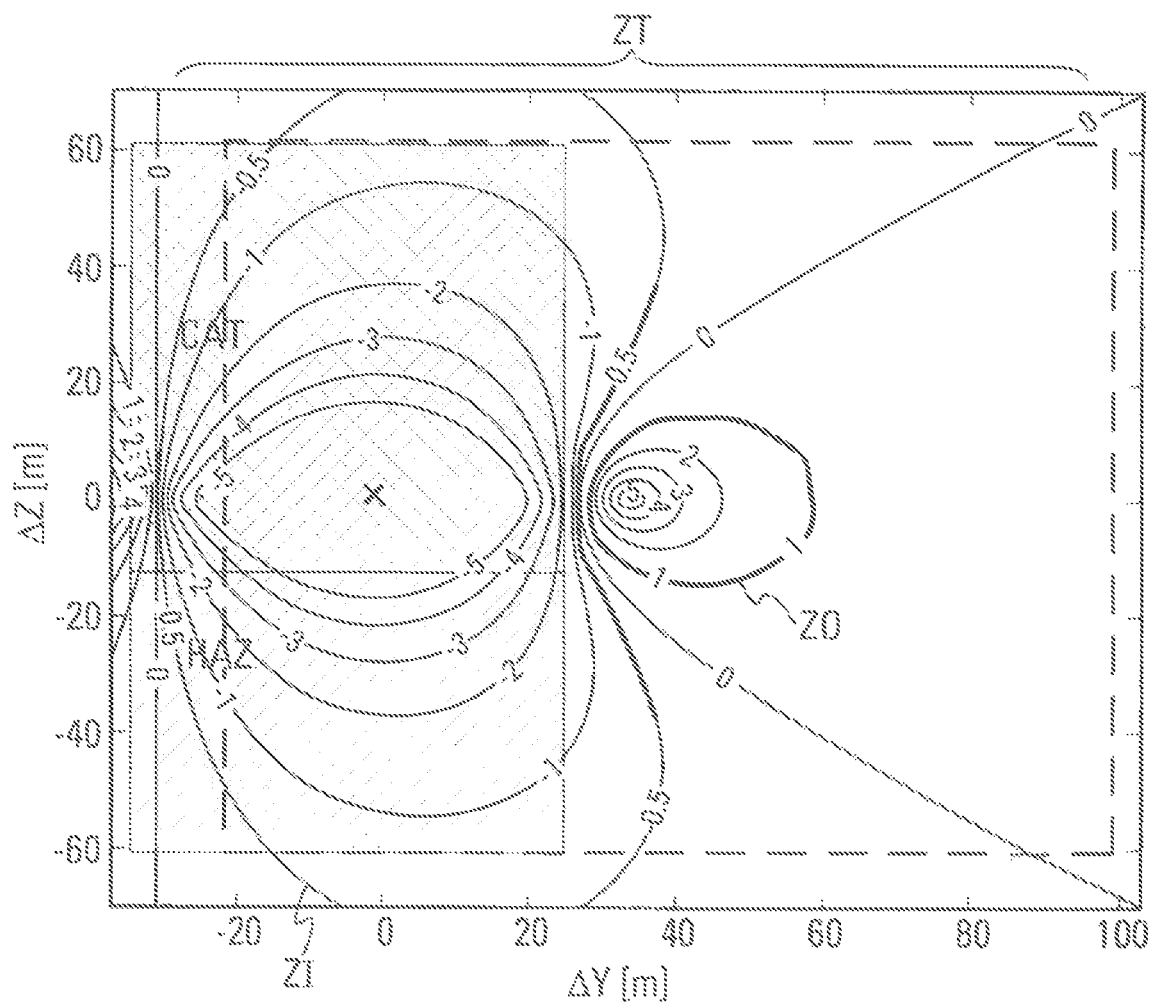
FIG. 4 is an exemplary spatial representation of the influence zone of a vortex as a function of the lateral and vertical positions.

The system S also comprises a first determination module 1A which is configured to determine the position of the vortices V1 and V2 generated in the wake of the leader airplane. The determination module 1A makes it possible to determine a location of an influence zone ZT (see FIGS. 4 and 5 for example) around each vortex V1 and V2, on the basis of the measurements of flight parameters provided by the set of information sources 10, and of data provided by the calculation element 11. Each influence zone ZT comprises a discomfort zone ZI and an optimization zone ZO, as is represented in FIG. 4. The optimization zone ZO corresponds to a zone in which the follower aircraft AC2 can benefit from the effects of a vortex which allow it to reduce its fuel consumption. These effects are, for example, a lift effect of the follower aircraft AC2. Additionally, there are several zones, namely, zones CAT and HAZ, shown in FIGS. 4 through 7.

The system S also comprises a second determination module 1B which is configured to determine an approach zone ZA around the vortex V1, V2, with the aid of measurements of flight parameters of the follower aircraft AC2 and AC1 as well as integrity values of these measurements. As represented in FIG. 5, the approach zone ZA is defined along the transverse axis Y and the vertical axis Z. The measurements of flight parameters are, by way of example, the measurements of positions of the follower aircraft AC2 and leader aircraft AC1 obtained by satellite positioning systems or the barometric altitude of each aircraft AC1, AC2. The integrity values regarding the measurements of positions of the leader aircraft AC1 and follower aircraft AC2 along the transverse axis Y are determined by a Horizontal Integrity Level, HIL. The values of integrity of the measurements of barometric altitude along the vertical axis Z are determined by an Air Data Reference unit, ADR. In a particular embodiment, the measurements of flight parameters and the corresponding integrity values also comprise wind measurements provided by an Air Data Inertial Reference Unit, ADIRU. The inertial reference unit and the satellite positioning system form part of the measurement unit 10A. The approach zone ZA is defined as a region along the transverse axis Y and the vertical axis Z around each vortex V1, V2 in which the probability of vortex presence is fixed and defined according to safety and operability criteria: it is sufficiently low to permit the cancellation of the operation but sufficiently high to necessitate a particular trajectory such as the approach section TA. In the approach zone ZA, the probability of vortex presence is lower than the probability of presence of the vortex in the search zone ZR. However, in this zone, the probability of vortex presence is greater than $10^{-7}$ per flying hour since the integrity value of the HIL is given with a probability of $10^{-7}$ per flying hour. This probability value can be adapted as a function of the fault rate of the ADR unit, in particular for the vertical axis Z.

Figure 6:
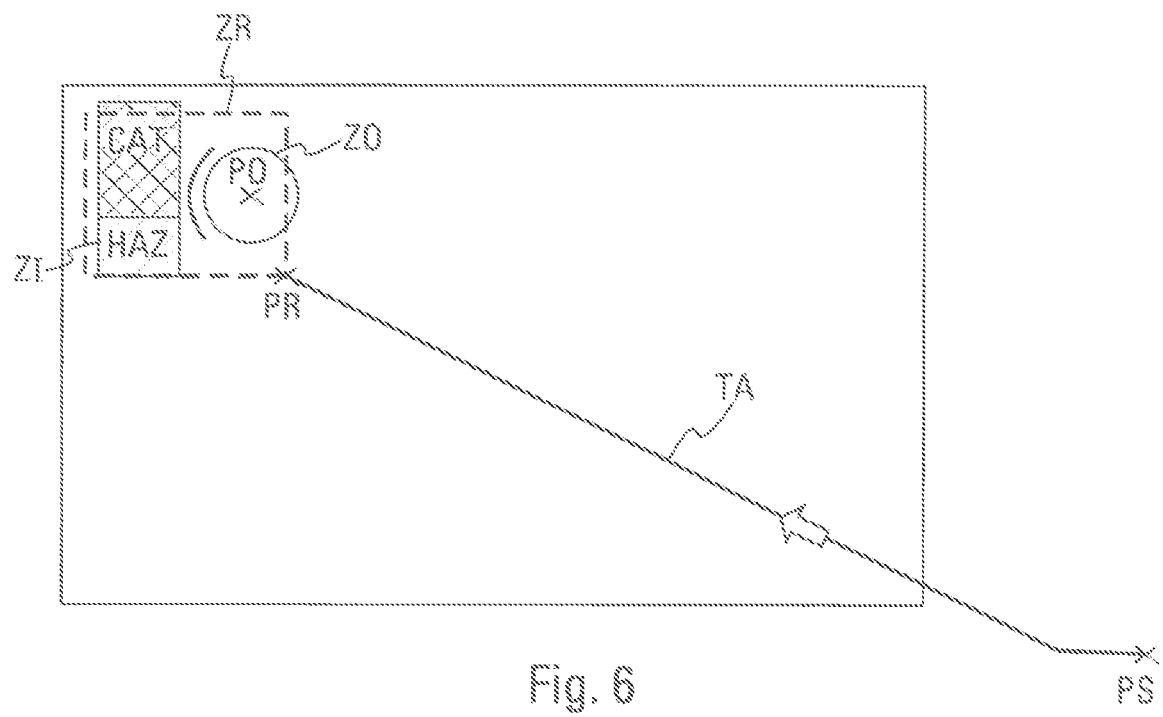
FIG. 6 represents an approach section in the approach zone, from the safety position up to the search position.

Moreover, the system S comprises a third determination module 1C which is configured to determine the search zone ZR with the aid of measurements of flight parameters of the follower aircraft AC2 and leader aircraft AC1 and of the values of precision of these measurements. The measurements of positions of the leader aircraft AC1 and follower aircraft AC2 as well as the position of the vortices V1 and V2 may lack precision. Precision values are determined by the horizontal and/or vertical figure of merit HFOM/VFOM ("Horizontal Figure Of Merit/Vertical Figure Of Merit"), By way of example, the precision value of the position measurements obtained from a GPS is 95%. It is also possible to couple the precision values with wind measurements provided by the sensors of the follower aircraft AC2 and/or leader aircraft AC1. The measurements of positions of the leader aircraft AC1 and follower aircraft AC2 and the precision values obtained by the HFOM\NFOM make it possible to define a search zone ZR along the transverse axis Y and the vertical axis Z, as represented in FIGS. 5 and 6. In this search zone ZR, the probability of presence of a vortex V1, V2 is deduced directly from the probability representative of the measurement precision. By way of example, 95% of the measurements lie in the search zone ZR defined by the HFOM\NFOM figure of merit. The precision in the measurements corresponds to the difference between the actual position of the vortex V1, V2 and the estimated position of the vortex V1, V2 when the equipment of the follower aircraft AC2 and leader aircraft AC1 operate in a nominal manner.

Moreover, the system S comprises a plurality of calculation modules 2A, 2B. In a particular embodiment, the calculation modules 2A and 2B form part of a calculation unit 2 (FIG. 1). In another embodiment, the calculation modules 2A and 2B are two separate calculation modules.

The calculation module 2A is configured to calculate the approach section TA in the approach zone ZA which is determined by the determination module 1B on the basis of the integrity values of HIL type. The approach section TA is calculated with the aid of values of flight parameters of the follower aircraft AC2 and leader aircraft AC1, of theoretical model of vortex characteristics, and as a function of the vortex V1, V2 characteristics (which include the wind). The values of flight parameters correspond in particular to measurements of the positions of the leader aircraft AC1 and follower aircraft AC2 transmitted by a satellite positioning system or on the basis of measurements of the barometric altitude as well as their integrity values, coupled with the information transmitted by the determination module 1A. The approach section TA starts at the safety position PS and finishes at a search position PR. The search position PR corresponds to a position representing the end of the approach zone ZA. The calculation module 2A is also configured to provide the data corresponding to the approach section TA to a control module 6.

The calculation module 2B is configured to calculate the search section TR in the search zone ZR, which is provided by the determination module 1C on the basis of the precision values of type HFOM\NFOM. The calculation of the search section TR is carried out on the basis of measurements of positions of the leader airplane AC1 and follower airplane AC2 transmitted by a satellite positioning system and as a function of the vortex V1, V2 characteristics (which include the wind). The measurements of positions can also be provided by an inertial platform embedded on board the follower aircraft AC2. The measurements of positions are coupled with the information transmitted by the determination module 1A to determine the position of the vortices V1 and V2. The search section TR starts at the search position PR and finishes at a precision position PP corresponding to a position representing the end of the search zone ZR. The calculation module 2B is also configured to provide the data corresponding to the search section TR to the control module 6.

Moreover, the system S comprises a plurality of control units 3, 4, 5 specified hereinafter. The positions of the vortices V1 and V2 generated by the leader aircraft AC1 as well as the locations of their respective influence zones ZT are transmitted to these control units 3, 4 and 5. Each control unit 3, 4, 5 comprises at least the control module 6 configured to control the flight of the follower aircraft AC2 along the approach section TA, search section TR and optimization section TO successively.

The control unit 3, which comprises the control module 6, controls the flight of the follower aircraft AC2 from the safety position PS up to a search position PR, along the approach section TA provided by the calculation module 2A, in the approach zone ZA.

As represented in FIG. 1, the control unit 3 also comprises a protection module 7 configured to, along the approach section TA, estimate the risk of entry of the follower aircraft AC2 into the discomfort zone ZI of a vortex V1, V2. This protection module 7 comprises:
  a measurement processing module 7A configured to process the values of the flight parameters. The processed flight parameters are forces and moments estimated by the difference between the value of the lateral attitude or the roll control value and their respective values away from any influence of vortices V1, V2;
  a test module 7B configured to compare the values of the forces and moments processed by the measurement processing module 7A with threshold values provided by the calculation element 11 based on theoretical model of vortex characteristics. The threshold values define the presence of the discomfort zone ZI of a vortex V1, V2;

a decision module 7C which:
   if the values of the moments and forces correspond to the threshold values characteristic of the presence of a discomfort zone ZI of a vortex V1, V2, decides to provide the control module 6 with an item of information in respect of fallback of the follower aircraft AC2 from its current position to a safety position PS, along a return section TR. The return section TR corresponds to the part already performed of the approach section TA but in an opposite direction; and
   if the values of the moments and forces do not correspond to the threshold values characteristic of the presence of a discomfort zone ZI of vortices V1, V2, decides not to provide any particular item of information to the control module 6.

Moreover, the control unit 4, which comprises the control module 6, controls the flight of the follower aircraft AC2 from the search position PR to a precision position PP, along the search section TR provided by the calculation module 2B, in the search zone ZR.

Moreover, the control unit 4 also comprises an estimation module 8 configured to estimate the optimization zone ZO. The estimation module 8 comprises, as represented in FIG. 1:
   a module for processing measurements 8A of the flight parameters. These flight parameters are moments and forces provided by the set of information sources 10. The set of information sources 10 can comprise an estimation of the forces and moments via the value of the roll control or the value of the lateral attitude of the follower aircraft AC2 from which are deducted respectively their estimated values away from any influence of vortices V1, V2;
   a test module 8B, configured to compare the values of the moments and forces, processed by the module for processing measurements 8A, with a plurality of threshold values determined on the basis of the information in respect of the positions of the vortices V1 and V2 and of the location of their influence zones ZT, provided by the vortex characteristics calculation element 11. The threshold values are representative of the effects generated in the influence zone ZT of a vortex V1, V2;
   a decision module 8C which:
      if the flight parameter values processed by the module for processing measurements 8A correspond to the threshold values representative of the optimization zone ZO, decides to provide an item of information to the control module 6, indicating the arrival of the follower aircraft AC2 at the precision position PP. The arrival of the follower aircraft AC2 at the precision position PP also corresponds to its entry into the optimization zone ZO; and
      if the flight parameter values processed by the module for processing measurements 8A correspond to the threshold values representative of the discomfort zone ZI, decides to provide, to the control module 6, an item of information in respect of passage from a search segment SR of the search section TR to a new search segment SR, the succession of search segment SR forming the search section TR; and
      if the flight parameter values processed do not correspond to the threshold values representative of the optimization zone ZO, decides not to provide any particular item of information to the control module 6.

Furthermore, the control unit 5 controls the flight of the follower aircraft AC2 from the precision position PP to the optimal position PO, along an optimization section TO in the optimization zone ZO. The optimization section TO is determined on the basis of measurements of flight parameters, provided by the set of flight parameter information sources 10, Moreover, the control unit 5 also comprises a convergence module 9 configured to determine, by a convergence calculation, the optimal position PO with respect to the current position of the follower aircraft AC2 provided by the measurement unit 10A such as the satellite positioning system or the estimations of forces and moments in the optimization zone ZO. The convergence module 9 comprises, as represented in FIG. 1:
   a module for processing measurements 9A which processes the measurements provided by the position and speed sensors of the leader and follower aircraft (GPS, barometer, . . . ) along the optimization section TO. To this effect, the optimization section TO comprises a plurality of optimization segments SOn the succession of which forms a sweep which is vertical and temporal in the environs of the optimization zone ZO and then lateral in the search zone ZO, so as to determine the optimal position PO that the follower aircraft AC2 seeks to reach, each optimization segment SOn corresponding to a distance between two current positions of the follower aircraft AC2 in the environs or in the optimization zone ZO (FIG. 8);
   a convergence module 9B which provides the processed measurements to a Kalman filter until the convergence of the optimal position PO in the optimization zone ZO to the optimal position PO provided by the calculation element 11 is obtained; and
   a decision module 9C which provides to the control module 5, an item of information in respect of determination of the optimal position PO determined by the convergence module 9B to the control module 6.

Figure 3:
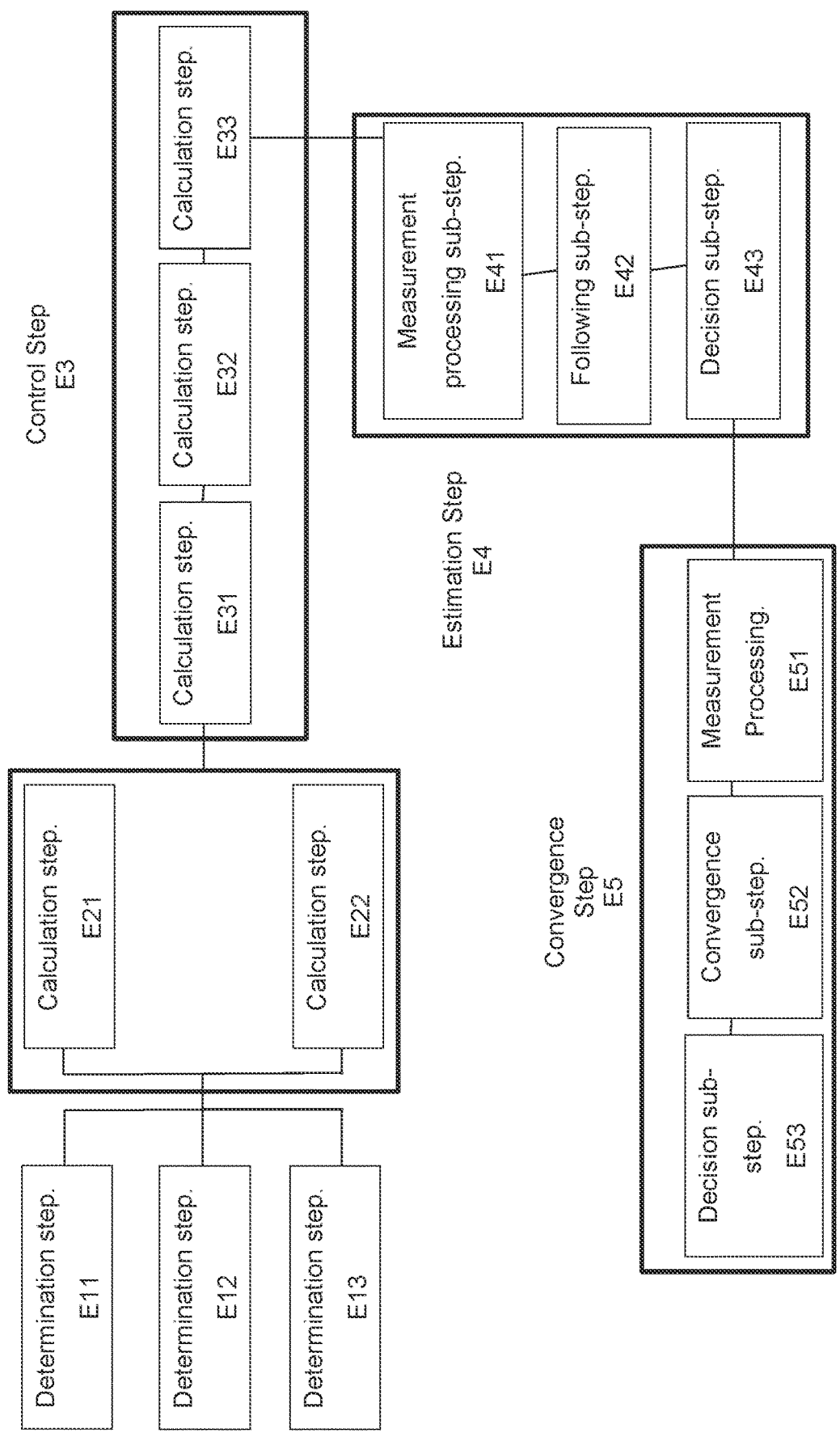
FIG. 3 is the schematic diagram of an embodiment of a method of controlling the trajectory of an aircraft in accordance with the disclosure herein.

The system S, such as described hereinabove, implements, in an automatic manner, the general steps of the method represented in FIG. 3.

In the course of this method, flight parameters of the leader aircraft AC1 and follower aircraft AC2 such as the position, the speed, the lateral attitude, the angular yaw rate, the angular roll rate, are measured and provided in a repetitive manner by the set of information sources 10 to the determination modules 1A, 1B and 10. The calculation element 11, which uses a theoretical model of the vortex characteristics, also provides the determination module 1A with information representative of the moments and forces generated by a vortex.

On the basis of the measurements provided by the set of information sources 10 and of the data transmitted by the calculation element 11, the determination module 1A determines, in the course of a determination step E11, the position of the vortex or vortices V1 and V2 generated in the wake of the leader aircraft AC1, An influence zone ZT of the vortices V1 and V2 in which the latter generate effects that can be measured by the calculation unit 10A is also determined.

As represented in FIG. 4, the influence zone ZT of a vortex is defined as a function of the value of the moments generated by a vortex as a function of the vertical distance $\Delta Z$ and transverse distance $\Delta Y$ relative to the position of the center of the vortex. As a function of the values of these moments, the influence zone ZT comprises a discomfort zone ZI and an optimization zone ZO, As represented in FIG. 4, for a vortex V1, situated to the right of the leader aircraft AC1 with respect to the fuselage axis in the direction of flight S, the discomfort zone ZI is a zone in which the value of the moments is less than −0.5. This is the suction zone generated by the vortex V1 which causes turbulences felt by the follower aircraft AC2. The optimization zone ZO is a zone in which the value of the moments is greater than −0.5. The optimization zone ZO therefore corresponds to a zone of repulsion of the vortex V1 which allows the follower aircraft AC2 to benefit from a recovery of lift that may result in a reduction in its fuel consumption.

The vortex V2 situated to the left of the leader airplane AC1 in the direction S of the flight trajectory TV generates similar effects to the vortex V1 situated to the right of the leader aircraft AC1 but with opposite moments, The approach zone ZA, centered on a vortex V1, V2 is thereafter determined in the course of a determination step E12. This determination step E12 comprises or consists in determining the size of the region surrounding the vortex V1, V2 such that the probability of vortex presence in this region is sufficiently low to permit the cancellation of the operation but sufficiently high to necessitate a particular trajectory such as the approach section TA. In the approach zone ZA, the probability of vortex presence is lower than the probability of presence of the vortex in the search zone ZR. However, in this zone, the probability of vortex presence is greater than $10^{-7}$ per flying hour since the integrity value of the HIL is given with a probability of $10^{-7}$ per flying hour. This probability value can be adapted as a function of the fault rate of the ADR unit, in particular for the vertical axis Z. In order to determine the size of this approach zone ZA, the determination module 1B uses the measurements of positions of the leader aircraft AC1 and follower aircraft AC2 provided by the satellite positioning system as well as the barometric altitudes. It is also necessary to know the integrity values of these measurements. The integrity values correspond to values of the HIL or of the barometric altitude. By way of example, the values of the HIL may be of the order of 150 metres. As regards the measurements of the barometric altitude, the integrity in these measurements is 300 feet.

In a variant, this information is supplemented with integrity values in respect of wind measurements provided by an Air Data Inertial Reference Unit (ADIRU) which forms part of the measurement unit 10A.

In the course of a determination step E13, the search zone ZR is determined. The search zone ZR corresponds to a region whose size is defined by a certain predetermined probability of presence of a vortex V1, V2. This probability of presence of a vortex V1, V2 is deduced directly from the probability representative of the precision of the measurements. By way of example, 95% of the measurements lie in the search zone ZR defined by the HFOM/VFOM figure of merit, The precision in the measurements corresponds to the difference between the actual position of the vortex V1, V2 and the estimated position of the vortex V1, V2 when the equipment of the follower aircraft AC2 and leader aircraft AC1 operate in a nominal manner. The determination of the size of the search zone ZR is performed on the basis of the measurements of positions of the leader aircraft AC1 and follower aircraft AC2 provided by the satellite positioning systems and the vortex V1 V2 positions coupled with the precision values in respect of these measurements. This information is supplemented with integrity values in respect of wind measurements provided by an Air Data Inertial Reference Unit (ADIRU) which forms part of the measurement unit 10A. These precision values are provided by the horizontal and/or vertical figure of merit HFOM/VFOM. By way of example, the possible error in the position measurements is about 60 metres.

The information on the approach zone ZA, coupled with the model of vortex characteristics, is provided to the calculation module 2A. During a calculation step E21, the approach section TA is determined defining the flight trajectory of the follower aircraft AC2, from its safety position in the direction of the vortex V1, V2 which is closest to it, as represented in FIGS. 5 and 6. By way of example, the approach section TA towards the vortex V1 situated to the right of the leader aircraft AC1 corresponds to a trajectory with a progressive increase in the altitude of the follower aircraft AC2 and a narrowing of bias towards the position of the vortex V1. The approach section TA finishes at a search position PR which corresponds to the end of the approach zone ZA.

During a calculation step E22, which can either succeed the calculation step E21 or be performed in parallel, the information on the search zone ZR determined in the determination step E12, is coupled with the model of vortex characteristics so as to calculate the search section TR in the search zone ZR. The search section TR is defined as the flight trajectory of the follower aircraft AC2 to a precision point PP which corresponds to the common limits of the search zone ZR and of the optimization zone ZO and is calculated in the calculation step E22. In order to optimize the search for the precision point PP, the search section TR comprises a plurality of search segments SRn (with n=1, . . . , with N being a positive integer number) in the search zone ZR. The first search segment SR1 starts at the search point PR. The length of each segment as well as the angle between several segments are determined by the vortex V1, V2 characteristics.

On the basis of the information on the approach section TA, provided to the calculation step E21, there is undertaken, in the course of a step E3, the control of the flight of the follower aircraft AC2 along the approach section TA in the approach zone ZA, from the safety position PS in which the follower aircraft AC2 is situated to the search position PR which defines the end of the approach zone ZA and the start of the search zone ZR.

The control step E3 comprises, in particular, a protection step comprising or consisting in performing a set of sub-steps E31 to E33 so as to determine whether a vortex, whose presence would not have been detected on the basis of the information of the determination modules 1A and 1B, is situated on the approach section TA of the flight of the follower aircraft AC2. Thus, in the course of a sub-step of processing measurements E31 are evaluated the moments or the forces measured by the difference between the value of the lateral attitude or the roll control value and their respective values away from any influence of vortices V1, V2. The processed measurements are transmitted to a test module 7B, which, during a test sub-step E32, compares them with threshold values determined in the determination step E11. The threshold values are characteristic of the values of the moments and forces in the influence zone ZT of a vortex V1, V2. The result of this comparison is thereafter transmitted to the decision module 7C.

During a following decision sub-step E33, the decision module 7C decides, as a function of the result of the comparison, whether an item of information is transmitted to the control module 6. Thus, if the values of the moments are zero, the follower aircraft AC2 continues its flight along the approach section TA. On the other hand, if the values of the measured moments correspond to the characteristic threshold values in the influence zone ZT of a vortex V1, V2, an item of information in respect of fallback of the follower aircraft AC2 to a safety position is transmitted to the control module 6. The flight of the follower aircraft AC2, from its current position to a safety position, is performed along a return section (see FIG. 5). The return section is determined by taking into account the possible displacements of the vortex V1, V2. The information on the possible displacements of the vortex V1, V2 is transmitted by the calculation element 11, coupled with wind measurements by surface sensors on the leader aircraft AC and follower aircraft AC2.

The return section can correspond to the approach section TA already performed during the flight of the follower aircraft AC2 from the initial safety position PS. As a variant, the return section can correspond to a trajectory to an auxiliary safety position PSA (see FIG. 5), The safety position PSA is the position symmetric to the initial safety point with respect to the position of the vortex V1, V2.

Figure 7:
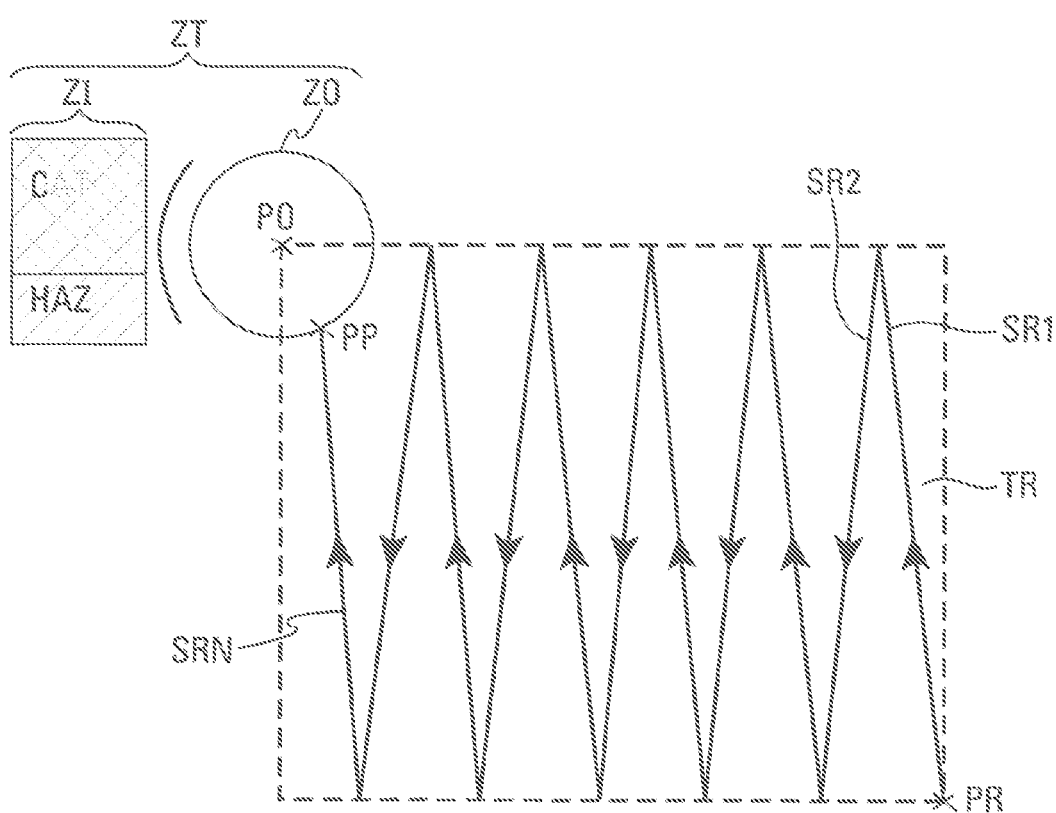
FIG. 7 represents a search section in the search zone, from the search position up to the precision position.

As represented in FIG. 7, when the search point PR is reached, the flight of the follower aircraft AC2 in the search zone ZR is controlled along the search section TR during a control step E4.

Moreover, the control step E4 comprises a search for the optimization zone ZO, performed in the course of an estimation step. The estimation step comprises a succession of sub-steps E41 to E43.

Thus, in the course of a measurement processing sub-step E41, the measurements provided by the difference between the value of the roll control or of the lateral attitude and their respective values estimated away from any influence of vortices V1, V2 are processed to determine values of moments and/or of force, representative of the feeling of the follower aircraft AC2 on the approach to the influence zone ZT of a vortex V1, V2. The measurements are processed throughout the succession of search segments SRn represented in FIG. 7. The processed measurements are thereafter transmitted to the test module 8B. In the course of a following sub-step E42, the test module 8B compares the processed measurements with threshold values of the moments and/or of the forces which are characteristic of the discomfort zone ZI and optimization zone ZO. The result of these comparisons is analysed in the course of a decision sub-step E43 by the decision module 8C.

If the processed measurements correspond to moments and/or forces which are characteristic of the optimization zone ZO, an item of information is provided to the control module 6, indicating the arrival of the follower aircraft AC2 at the precision position PP. By way of example, for the vortex V1, values of the moments, provided to the measurement processing sub-step E41, of greater than or equal to 1, indicate that the follower aircraft AC2 has arrived at the precision position PP. The control module 6 receives the item of information in respect of arrival at the precision position PP and commands the passage to a control step E5 and therefore controls the flight of the follower aircraft AC2 in the optimization zone ZO.

If the processed measurements correspond to moments and/or forces which are characteristic of the discomfort zone ZI, an item of information is provided to the control module 6, indicating the passage to a new search segment SRn making it possible to avoid the entry of the follower aircraft AC2 into the discomfort zone ZI, By way of example, for the vortex V1, values of the moments, provided to the measurement processing sub-step E41, of less than −0.5, indicate that the follower aircraft AC2 has not arrived at the precision position PP but at the entry of the discomfort zone ZI. This discomfort zone ZI, represented in FIG. 4, and in particular the part of the discomfort zone ZI between the two vortices V1 and V2, represent a genuine danger for the flight of the follower aircraft AC2. The control module 6 receives an item of information in respect of passage to a new search segment SRn and commands such a change of trajectory so as to avoid the discomfort zone ZI.

Finally, if the processed measurements do not correspond to moments and/or forces which are characteristic of the influence zone ZT, no particular item of information is provided to the control module 6. The control module 6 then continues to control the flight of the follower aircraft AC2 in the search zone ZR along a plurality of search segments SRn forming the search section TR.

Moreover, if along the search section TR, the search for the optimization zone ZO has not succeeded, an item of information is provided to the control module 6 to control the flight of the follower aircraft AC2 towards a safety position. By way of example, this safety position may be the auxiliary safety position PSA.

When the follower aircraft AC2 has reached the precision position PP, its flight is controlled towards the optimal position PO in the optimization zone ZO during a control step E5. However, the estimation of the optimal position PO may be marred by errors due to the sensors and to the satellite positioning systems. Thus, in the course of a convergence step, the actual optimal position PO is estimated by convergence. The estimation of the optimal position PO may be marred by errors due to the wind information and to the measurements of the satellite positioning systems. The convergence step comprises a succession of several sub-steps E51 to E53.

Figure 8:
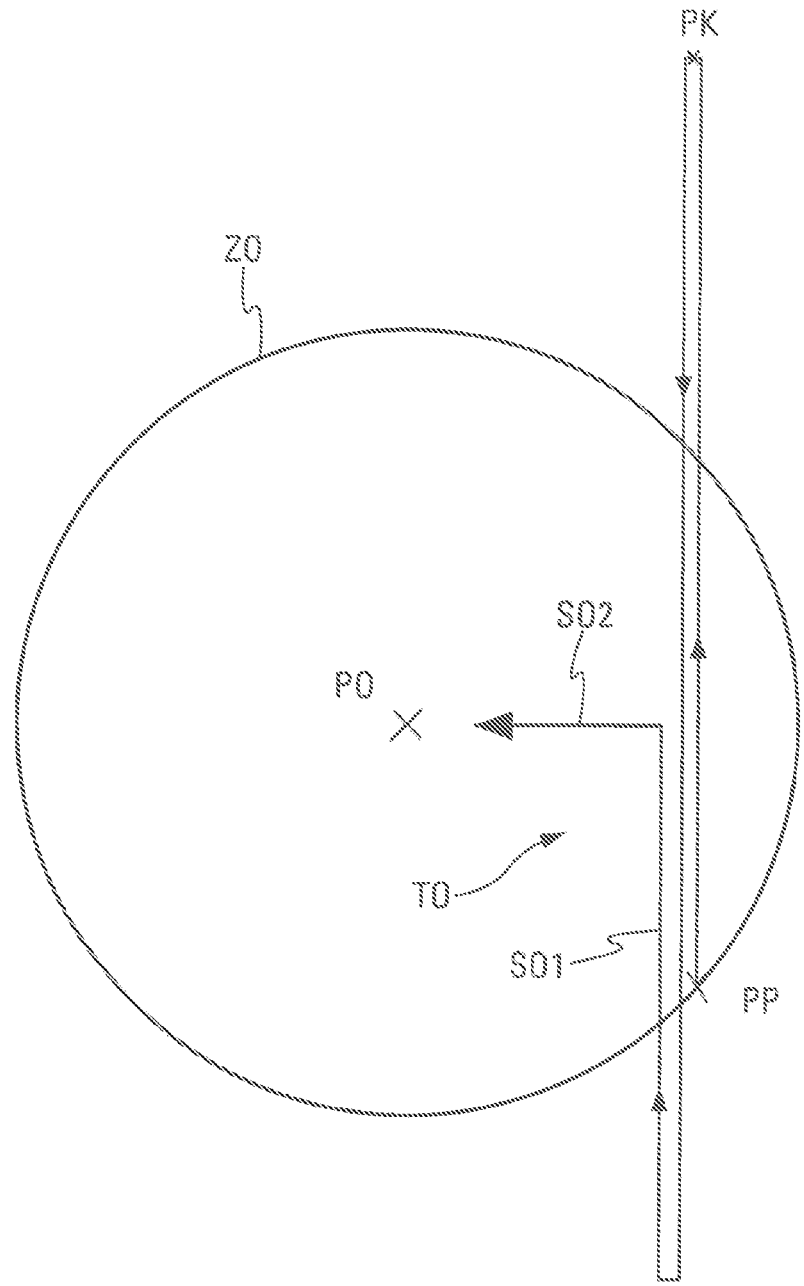
FIG. 8 represents an optimization section in the optimization zone, from the precision position up to the optimal position.

Thus, in the course of a sub-step of processing measurements E51, the measurements of the lateral attitude or of the roll control, provided by the measurement unit 10A, are processed to determine the moments and forces felt by the follower aircraft AC2 in the optimization zone ZO. The processing of these measurements consists in deducting from the values of the measurements of lateral attitude or of roll control, estimations, respectively, of the lateral attitude or of the roll control in the absence of vortex. As represented in FIG. 8, when the follower aircraft AC2 reaches the precision point PP, it performs an additional flight on a vertical search segment up to an ancillary position PK in a part of the search zone ZR in the environs of the optimization zone ZO. This additional search segment which extends to the ancillary position PK makes it possible to take into account the potential errors in the optimal position PO with respect to the precision position PP when the follower aircraft AC2 penetrates the optimization zone. From the ancillary position PK, the flight of the follower aircraft AC2 continues on a plurality of additional search segments and then of optimization segments SO1 and SO2. Successive traversal of these vertically and temporally very narrowly spaced segments allows the measurement unit 10A and the measurement processing module 9A, in the course of the measurement processing sub-step E51, to measure and to process a large number of measurements of the sensors in the optimization zone ZO and in a part of the search zone ZR in the environs of the optimization zone ZO. Moreover, this vertical sweep allows the follower aircraft AC2 to center its position vertically with the axis of symmetry of the vortex V1, V2. When the follower aircraft AC2 is centered vertically, it gets closer laterally in the direction of the optimal point PO.

In parallel with these displacements, during a convergence sub-step E52, the processed measurements, representing the moments and/or the forces felt by the follower aircraft AC2 in the environs and then in the optimization zone ZO, are provided to a Kalman filter until the convergence of the value of the optimal position PO by the Kalman filter is obtained.

Thereafter, an item of information in respect of the determination of the actual optimal position PO representative of the value of the optimal position PO obtained previously is transmitted, during a decision sub-step E53, to the control module 6.

While at least one exemplary embodiment of the invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "an" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A method of controlling a trajectory of a follower aircraft to an optimal position, in which the follower aircraft benefits from effects of at least one of the vortices generated by a leader aircraft, the leader aircraft and the follower aircraft carrying out a formation flight in which the leader aircraft precedes the follower aircraft, the method comprising a succession of steps comprising:
   a first section control step, implemented by a first controller, the first section control step comprising controlling flight of the follower aircraft, based on current measurements of flight parameters of the follower aircraft and of the leader aircraft, from a safety position to a search position, along an approach section of the trajectory passing through an approach zone;
   a second section control step, implemented by a second controller, the second section control step comprising controlling the flight of the follower aircraft, downstream of the approach section in a direction of flight of the follower aircraft, based on the current measurements of the flight parameters of the follower aircraft and of the leader aircraft, from the search position to a precision position, along a search section of the trajectory passing through a search zone;
   a third section control step, implemented by a third controller, the third section control step comprising controlling the flight of the follower aircraft, downstream of the search section in the direction of flight of the follower aircraft, from the precision position to the optimal position, along an optimization section of the trajectory passing through an optimization zone;
   a first determination step, implemented by one or more processors of a first determination module, prior to the first section control step, the first determination step comprising, with aid of the current measurements of the flight parameters of the follower aircraft and of the leader aircraft and of a theoretical model of vortex characteristics, determining a position of a center of a vortex and a location of an influence zone generated by and situated around the vortex, the influence zone comprising a discomfort zone and the optimization zone;
   a second determination step implemented by one or more processors of a second determination module, the second determination step comprising determining the approach zone with aid of the current measurements of the flight parameters of the follower aircraft and of the leader aircraft and of values of integrity of the current measurements; and
   a third determination step, implemented by one or more processors of a third determination module, the third determination step comprising determining the search zone with aid of the current measurements of the flight parameters of the follower aircraft and of the leader aircraft and of values of precision of the current measurements, a common limit between the approach zone and the search zone being defined by the search position;
   wherein the optimization section comprises a plurality of optimization segments a succession of which forms a sweep, which is vertical and temporal in environs of the optimization zone and then lateral in the search zone, to determine the optimal position that the follower aircraft seeks to reach, each optimization segment corresponding to a distance between two positions of the follower aircraft in the environs or in the optimization zone; and
   wherein, during at least a portion of the sweep, the follower aircraft goes beyond a boundary of the optimization zone.

2. The method according to claim 1, comprising a first calculation step, implemented by one or more processors of a first calculation module, the first calculation step comprising calculating, and then providing to the fist controller, the approach section in the approach zone, determined in the second determination step by the second determination module, with aid of values of the current measurements of the flight parameters of the follower aircraft and of the leader aircraft and of the theoretical model of vortex characteristics.

3. The method according to claim 2, comprising a second calculation step, implemented by one or more processors of a second calculation module, the second calculation step comprising calculating, and then providing to the second controller, the search section in the search zone, determined in the third determination step by the third determination module, with aid of values of the current measurements of the flight parameters of the follower aircraft and of the leader aircraft and of the theoretical model of vortex characteristics.

4. The method according to claim 1, wherein the first section control step comprises a protection step, implemented by one or more processors of a protection module, the protection step comprising a succession of sub-steps comprising:
   a first sub-step of processing measurements, implemented by one or more processors of a first module for processing measurements, the first sub-step of processing measurements comprising processing values of the flight parameters of the follower aircraft and of the leader aircraft in the approach zone;
   a first test sub-step, implemented by one or more processors of a first test module, the first test sub-step comprising comparing the values of the flight parameters of the follower aircraft with threshold values of flight parameters, determined by the theoretical model of vortex characteristics; and a first decision sub-step, implemented by one or more processors of a first decision module, the first decision sub-step comprising:
when the values of the flight parameters correspond to characteristic threshold values in the influence zone of the vortex, providing, to the first controller, an item of information in respect of fallback of the follower aircraft from the approach zone to the safety position along a return section; and
when the values of the flight parameters do not correspond to the characteristic threshold values in the influence zone, not providing any particular item of information to the first controller.

5. The method according to claim 1, wherein the search section comprises a plurality of search segments a succession of which forms a spatial and temporal sweep of the search zone dependent on the vortex characteristics, to optimize the search for the optimization zone and avoidance of the discomfort zone by the follower aircraft.

6. The method according to claim 1, wherein the second section control step comprises an estimation step, implemented by one or more processors of an estimation module, the estimation step comprising searching for the optimization zone and comprising a succession of sub-steps comprising:
a second measurement processing sub-step, implemented by one or more processors of a measurement processing module, the second measurement processing sub-step comprising processing values of the flight parameters of the follower aircraft and of the leader aircraft in the search zone;
a second test sub-step, implemented by one or more processors of a test module, the second test sub-step comprising comparing the values of the flight parameters of the follower aircraft and of the leader aircraft with threshold values of flight parameters, determined by the theoretical model of vortex characteristics; and
a second decision sub-step, implemented by one or more processors of a decision module, the second decision sub-step comprising:
when the values of the flight parameters correspond to characteristic threshold values in the optimization zone, providing an item of information in respect of arrival of the follower aircraft at the precision position to the second controller, the precision position representing a position of entry into the optimization zone;
when the values of the flight parameters correspond to characteristic threshold values in the discomfort zone, providing an item of information in respect of passage from the current search segment to a new search segment to the second controller, to avoid entry of the follower aircraft into the discomfort zone; and
when the values of the flight parameters do not correspond to characteristic threshold values in the influence zone, not providing any particular item of information to the second controller.

7. The method according to claim 1, wherein the third section control step comprises a convergence step, implemented by one or more processors of a convergence module, the convergence step comprising determining the optimal position with respect to the current position of the follower aircraft in the optimization zone and comprising a succession of sub-steps comprising:
a third measurement processing sub-step, implemented by one or more processors of a third measurement processing module, the third measurement processing sub-step comprising processing values of the flight parameters of the follower aircraft on each optimization segment;
a third convergence calculation sub-step, implemented by one or more processors of a convergence calculation module, the third convergence calculation sub-step comprising providing the values of the flight parameters to a Kalman filter until the optimal position obtained by the Kalman filter is consistent, or converges, with the optimal position obtained by the theoretical model of vortex characteristics; and
a third decision sub-step, implemented by one or more processors of a decision module, the third decision sub-step comprising providing an item of information in respect of flight control of the follower aircraft up to the optimal position to the third controller.

8. A system for controlling trajectory of a follower aircraft to an optimal position, in which the follower aircraft benefits from effects of at least one of vortices generated by a leader aircraft, the leader aircraft and the follower aircraft carrying out a formation flight in which the leader aircraft precedes the follower aircraft, the system comprising:
a first controller in communication with at least one control module and being configured to control flight of the follower aircraft, based on current measurements of flight parameters of the follower aircraft and of the leader aircraft, from a safety position to a search position, along an approach section of the trajectory passing through an approach zone;
a second controller in communication with at least the control module and being configured to control the flight of the follower aircraft, downstream of the approach section in a direction of flight of the follower aircraft, based on the current measurements of the flight parameters of the follower aircraft and of the leader aircraft, from the search position to a precision position, along a search section of the trajectory passing through a search zone; and
a third controller in communication with at least the control module and being configured to control the flight of the follower aircraft, downstream of the search section in the direction of flight of the follower aircraft, from the precision position to the optimal position, along an optimization section of the trajectory passing through an optimization zone;
a first determination module, comprising one or more processors configured to, with aid of the current measurements of the flight parameters of the follower aircraft and of the leader aircraft and of a theoretical model of vortex characteristics, determine a position of a center of a vortex and a location of an influence zone generated by and situated around the vortex, the influence zone comprising a discomfort zone and the optimization zone;
a second determination module, comprising one or more processors configured to determine the approach zone with aid of the current measurements of the flight parameters of the follower aircraft and of the leader aircraft and of values of integrity of the current measurements;
a third determination module, comprising one or more processors configured to determine the search zone with the aid of the current measurements of the flight parameters of the follower aircraft and of the leader aircraft and of values of precision of the current measurements, a common limit between the approach zone and the search zone being defined by the search position;

wherein the optimization section comprises a plurality of optimization segments a succession of which forms a sweep, which is vertical and temporal in environs of the optimization zone and then lateral in the search zone, to determine the optimal position that the follower aircraft seeks to reach, each optimization segment corresponding to a distance between two positions of the follower aircraft in the environs or in the optimization zone; and wherein, during at least a portion of the sweep, the follower aircraft goes beyond a boundary of the optimization zone.

9. The system according to claim 8, comprising a first calculation module comprising one or more processors configured to calculate, and then provide to the control module, the approach section in the approach zone, determined by the second determination module, with the aid of values of the current measurements of the flight parameters of the follower aircraft and of the leader aircraft and of the theoretical model of vortex characteristics.

10. The system according to claim 8, comprising a second calculation module comprising one or more processors configured to calculate, and then provide to the control module, the search section in the search zone determined by the third determination module, with aid of values of the current measurements of the flight parameters of the follower aircraft and of the leader aircraft and of the theoretical model of vortex characteristics.

11. The system according to claim 8, wherein the first controller comprises a protection module comprising:
a first measurement processing module comprising one or more processors configured to process values of the flight parameters of the follower aircraft and of the leader aircraft in the approach zone;
a first test module comprising one or more processors configured to compare the values of the flight parameters of the follower aircraft with threshold values of flight parameters, determined by the theoretical model of vortex characteristics; and
a first decision module comprising one or more processors configured such that:
when the values of the flight parameters correspond to characteristic threshold values in the influence zone of the vortex, to provide, to the control module, an item of information in respect of fallback of the follower aircraft from the approach zone to the safety position along a return section; and
when the values of the flight parameters do not correspond to the characteristic threshold values in the influence zone, to not provide any particular item of information to the control module.

12. The system according to claim 8, wherein the second controller comprises an estimation module comprising one or more processors configured to estimate the optimization zone, the estimation module comprising:
a second measurement processing module comprising one or more processors and configured to process values of the flight parameters of the follower aircraft in the search zone;
a second test module comprising one or more processors configured to compare the values of the flight parameters of the follower aircraft with threshold values of flight parameters determined by the theoretical model of vortex characteristics; and
a third decision module comprising one or more processors configured such that:
when the values of the flight parameters correspond to characteristic threshold values in the optimization zone, to provide an item of information in respect of arrival of the follower aircraft at the precision position to the control module, the precision position representing a position of entry into the optimization zone; and
when the values of the flight parameters correspond to characteristic threshold values in the discomfort zone, to provide an item of information in respect of passage from the current search segment to a new search segment to the control module, to avoid entry of the follower aircraft into the discomfort zone; and
when the values of the flight parameters do not correspond to characteristic threshold values in the influence zone, to not provide any particular item of information to the control module.

13. The system according to claim 8, wherein the third controller comprises a convergence module comprising one or more processors configured to determine the optimal position with respect to the current position of the follower aircraft in the optimization zone and comprising:
a third measurement processing module comprising one or more processors configured to process values of the flight parameters of the follower aircraft on each optimization segment;
a third convergence calculation module comprising one or more processors configured to provide the values of the flight parameters to a Kalman filter until the optimal position obtained by the Kalman filter is consistent, or converges, with the optimal position obtained by the theoretical model of vortex characteristics; and
a third decision module comprising one or more processors configured to provide an item of information in respect of flight control of the follower aircraft up to the optimal position to the control module.

14. An aircraft comprising a system for controlling trajectory of a follower aircraft to an optimal position, in which the follower aircraft benefits from effects of at least one of vortices generated by a leader aircraft, the leader aircraft and the follower aircraft carrying out a formation flight in which the leader aircraft precedes the follower aircraft, the system comprising:
a first controller in communication with at least one control module and being configured to control flight of the follower aircraft, based on current measurements of flight parameters of the follower aircraft and of the leader aircraft, from a safety position to a search position, along an approach section of the trajectory passing through an approach zone;
a second controller in communication with at least the control module and being configured to control the flight of the follower aircraft, downstream of the approach section in a direction of flight of the follower aircraft, based on the current measurements of the flight parameters of the follower aircraft and of the leader aircraft, from the search position to a precision position, along a search section of the trajectory passing through a search zone; and
a third controller in communication with at least the control module and being configured to control the flight of the follower aircraft, downstream of the search section in the direction of flight of the follower aircraft, from the precision position to the optimal position, along an optimization section of the trajectory passing through an optimization zone;

a first determination module, comprising one or more processors configured to, with aid of the current measurements of the flight parameters of the follower aircraft and of the leader aircraft and of a theoretical model of vortex characteristics, determine a position of a center of a vortex and a location of an influence zone generated by and situated around the vortex, the influence zone comprising a discomfort zone and the optimization zone;

a second determination module, comprising one or more processors configured to determine the approach zone with aid of the current measurements of the flight parameters of the follower aircraft and of the leader aircraft and of values of integrity of the current measurements; and a third determination module, comprising one or more processors configured to determine the search zone with the aid of the current measurements of the flight parameters of the follower aircraft and of the leader aircraft and of values of precision of the current measurements, a common limit between the approach zone and the search zone being defined by the search position;

wherein the optimization section comprises a plurality of optimization segments a succession of which forms a sweep, which is vertical and temporal in environs of the optimization zone and then lateral in the search zone, to determine the optimal position that the follower aircraft seeks to reach, each optimization segment corresponding to a distance between two positions of the follower aircraft in the environs or in the optimization zone; and wherein, during at least a portion of the sweep, the follower aircraft goes beyond a boundary of the optimization zone.

* * * * *